H. W. Randle,
Cotton Press,

Nº 19,381. Patented Feb. 16, 1858.

UNITED STATES PATENT OFFICE.

H. W. RANDLE, OF BARNSVILLE, ALABAMA.

IMPROVEMENT IN COTTON-PRESSES.

Specification forming part of Letters Patent No. 19,281, dated February 16, 1858.

*To all whom it may concern:*

Be it known that I, H. W. RANDLE, of Barnsville, in the county of Dallas and State of Alabama, have invented a new and useful Improvement in Cotton-Presses; and I do hereby declare that the following is a full, clear, and exact description of the construction and operation of the same, reference being had to the annexed drawings, forming part of this specification, in which—

Figure 1:
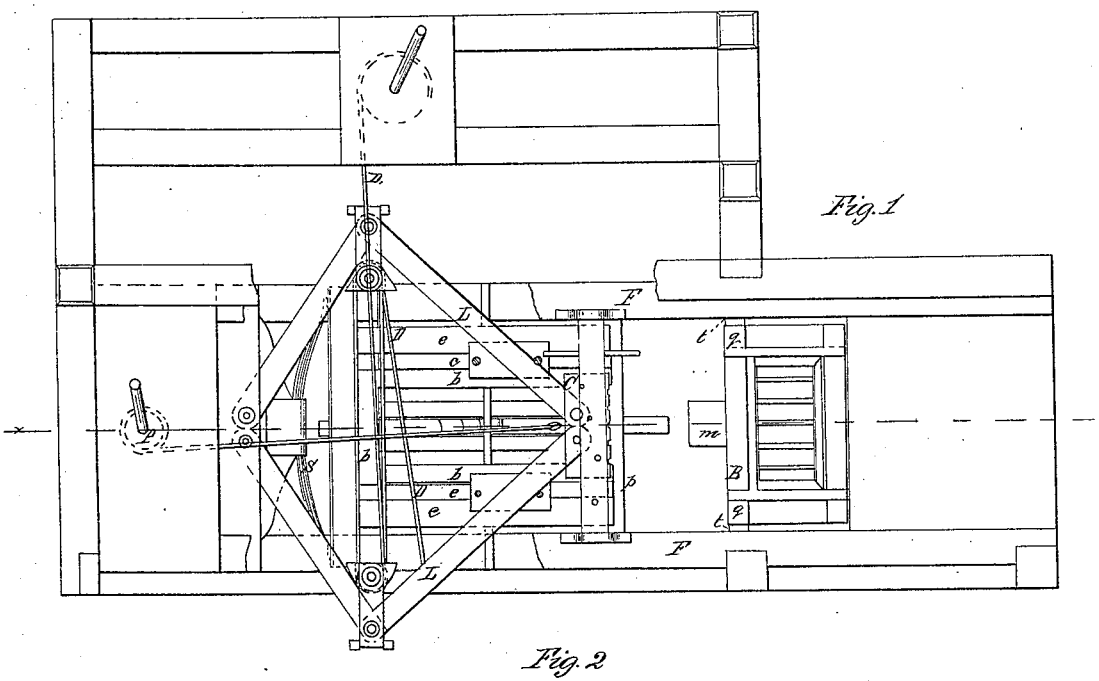
Figure 2:
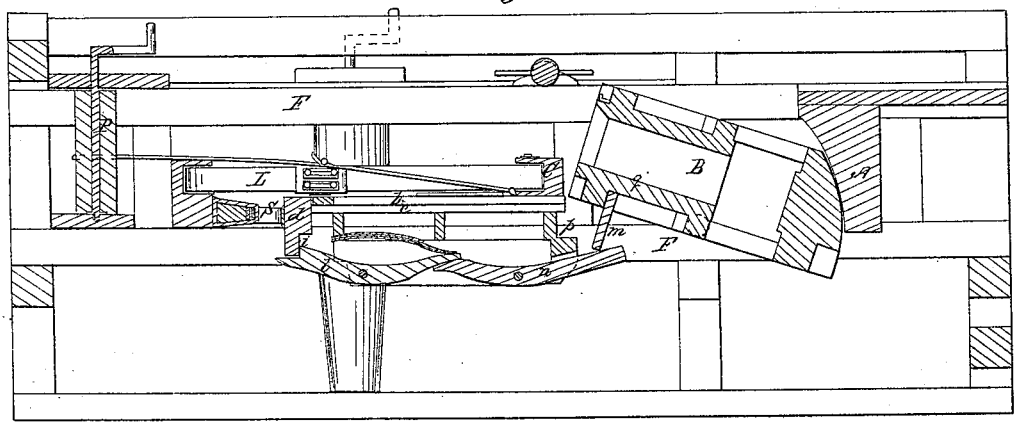
Figure 3:
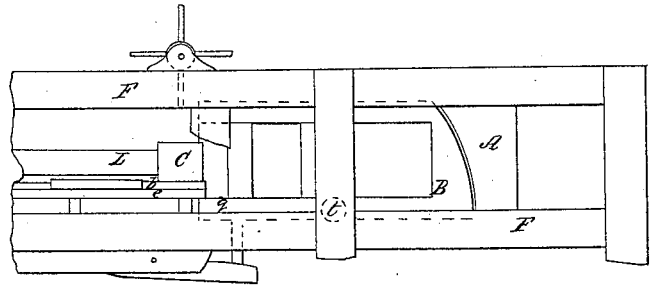

Figure 1 is a top view of the press. Fig. 2 is a vertical section on line $x\,x$. Fig. 3 is a side view box, showing the manner in which it is held in horizontal position.

Similar characters of reference in the several figures denote the same parts of the press.

The character of press to which my invention refers is that in which the box is connected with the frame by trunnions, so as to be revolved into a vertical position to receive the cotton, and then turned into a horizontal position to receive the follower, the movement of which is horizontal.

The nature of the invention consists in combining with the revolving box a device for securing it in horizontal position after it has been turned down, and causing it to be released by the withdrawal of the follower after the discharge of the packed bale.

In the drawings, F is the main frame, in which is hung the box B by trunnions $t$, so that it may assume the vertical position shown in Fig. 1, for the reception of the cotton, and then be drawn down, as shown in Fig. 2, into the horizontal position of Fig. 3. The surface of cross-beam A is curved concentric with trunnions of box, the extremity of the box having also the same form. This gives a firm bearing-surface against which to pack. In the drawings the gates of the packing-chamber are removed. The follower C is secured to a carriage, $b$, which is moved by power applied to levers L through cord D, as indicated in Fig. 1. This mode of effecting compression being well known need not be particularly described.

Resting against the guides $c$ of follower-carriage is a frame consisting of sides $e\,e$ and rear cross-piece, $d$. This cross-piece is acted upon by a spring, S, so as to give the frame a forward tendency. It is held back by the shoulder $i$ of lever $l$ in front of cross-piece $d$, as shown in Fig. 2.

Under box B is a depending stud, $m$, which, as said box is drawn down, presses upon lever $n$, causing cross-piece $d$ to be released from shoulder $i$ the instant the front of the box reaches its seat $p$. The spring S then acts, forcing the sliding frame forward, so that the extremities of side pieces, $e\,e$, move over the lower string-pieces, $q$, of the box, as shown in Fig. 3, and secure the box in its horizontal position. The cross-piece $d$, in its forward movement, encounters the rear of carriage $b$, and, imparting a slight movement to the carriage, causes the follower to enter the mouth of the box. After the pressing operation the bale is secured in the usual manner, and the gates of the pressing-chamber opened. The withdrawal of the follower by power applied to shaft P permits the bale to be discharged from its chamber. As the follower is drawn out of the box, the rear of its frame encounters the cross-piece $d$, and thus enables the power exerted in the withdrawal of the follower to overcome the strength of spring S and cause slide-pieces $e\,e$ to be withdrawn from off the string-pieces of the box. Shoulder $i$ of lever $l$ then rises in front of cross-piece $d$, Fig. 2, and box B turns into its vertical position.

What I claim, and desire to secure by Letters Patent, is—

The revolving box B and follower C, mounted on a carriage, as described, in combination with the sliding frame $d\,e\,e$, so constructed as to lock the box and be withdrawn, substantially as hereinbefore set forth.

In testimony whereof I have hereunto signed my name before two subscribing witnesses.

H. W. RANDLE.

Witnesses:
GEO. PATTEN,
JOHN S. HOLLINGSHEAD.